3,066,022
PROCESS FOR THE MANUFACTURE OF
PULVERIZED IRON
Kanzo Yamazaki, Toyono-machi, Kami-Minochigun, Japan, assignor to Hokuriku Kako Kabushiki Kaisha, Tokyo, Japan, a corporation of Japan
No Drawing. Filed July 15, 1959, Ser. No. 827,149
2 Claims. (Cl. 75—.5)

The present invention relates to a process for the manufacture of pulverized iron, and more particularly the manufacture of pulverized iron of an extraordinarily high purity by a simple procedure and at a remarkably low cost, whereby iron or steel is nitrided at an appropriate temperature and then the resulting brittle material is pulverized to a desired grain size, and finally denitrided either at an appropriate temperature in a denitriding gas, such as hydrogen, or by thermal decomposition under avoidance of oxidation.

The object of this invention is to provide a process which is extraordinarily simple and can avoid usual disadvantages and provide an extraordinarily high purity of iron powders.

Prior methods for the production of pulverized iron include:
 (1) Pulverization of electrolytic iron;
 (2) Reducing high purity oxidized iron powder and crushing the resulting reduced iron poweder;
 (3) Spraying molten iron;
 (4) Reducing and purifying powdered iron ores; etc.

The process of prior method 1, i.e. a process of pulverizing electrolytic iron, is only applicable to extremely special uses, because electrolytic iron is inherently of a very high price and iron pulverized to a desired grain size from such a high price material as the electrolytic iron is consequently of a still higher price.

In the process of prior method 2—a process wherein oxidized, pulverized iron of a high degree of purity is reduced and the thus reduced powders are pulverized—the pulverized iron powder obtainable is at most 98% Fe, even when high grade or high purity iron ores are available. Even when thin steel sheets are oxidized to get oxidized iron powders which are used as raw material, the product will only be iron powder of approximately 98.5% Fe.

Regardless of the purity of the material upon which this process is performed, it has been proved to be impossible to obtain 100% purificaion.

The iron powder according to this process is of a rather considerably high cost, although of course it is of relatively low cost as compared with an electrolytic pulverized iron.

In the process of prior method 3, wherein molten iron is sprayed, a molten iron with the carbon content being controlled, for instance, at 3.2 to 3.4% is ejected through an alumina nozzle with compressed air for converting said molten iron into powder form, which is reduced in an atmosphere including C and O at a ratio 3:2, and further which is pulverized. Thus, the remaining oxygen will amount to around 0.7% and the purity will be about 98%. Such procedures are intricate and high cost results.

In the process of prior method 4, for reducing fine ores which is accompanied by purification, raw materials may be low priced, but a complex procedure is required in such a case. Accordingly, the product obtained becomes high priced and the purity of the product is about 98% at most. 0.7 to 0.8% oxygen remain at least.

The process according to the present invention eliminates all of the above-stated disadvantages; and moreover, quite contrary to the prior processes, it is an entirely novel process.

Thus, the raw material that can well be used is extremely low priced iron or steel scrap or turnings, etc. The unpulverizable iron or steel is, according to the present invention, pulverized by taking advantage of its becoming brittle upon nitriding. Such a nitriding is effected at 500° to 800° C. for an appropriate period of time with ammonia gas. Iron and steel sheets of an excessive thickness do not permit the nitriding thereof to proceed to a sufficient depth into the core. Therefore, turnings of relatively thin plate iron scrap, etc. are used as starting materials. Those materials are nitrided so that a pulverizable brittleness can be attained, and thereafter, the remaining brittle materials are pulverized to a desired particle size. Then the pulverized powders are freed of nitrogen by either heating them at a suitable temperature above 400° C. for an appropriate interval of time with a denitriding gas, such as hydrogen, or they are thermally decomposed at a temperature above 700° C., while avoiding oxidation, to restore them to the original iron. In this case, a high purity iron powder of above 99% iron can be manufactured.

Thus, according to the present invention, a mass production of high purity pulverized iron can be made from extraordinarily low priced raw materials in a simple operation.

*Examples*

(1) Using 500 gm. thin steel plate scrap of 0.5 mm. thickness, this was placed in layers and charged in a 5 kw.h. muffle furnace, and treated at 750° C. for one hour while ammonia gas was passed therethrough, and crushed after being cooled, and screened mesh to —100. The resulting powder was charged again in the 4 kw.h. muffle furnace and treated for 0.5 hour at 800° C. With the waste gas from the nitriding referred to above passed therethrough, the treatment was effected, which resulted in a production of 485 gm. iron powder (—100 mesh) of 99.5% Fe.

(2) 500 gm. mild steel scrap were charged in a 4 kw.h. muffle furnace and treated at 700° C. for one hour with ammonia gas, crushed after cooling, and sieved to —100 mesh.

Again, the above powders were charged in the 4 kw.h. muffle furnace and treated at 800° C. for 0.5 hour with the waste gas from the nitriding referred to above being passed, and 490 gm. iron powder of 99.2% Fe (—100 mesh) were obtained.

What I claim:
1. A process for manufacturing pulverized iron of high purity, said process comprising charging steel plate scrap of substantially 0.5 mm. thickness in layers into a furnace, maintaining the layers of scrap at a temperature of substantially 750° C. in the furnace for one hour, passing ammonia gas between the layers of scrap in the furnace to nitride the scrap, cooling the nitrided product, crushing the cooled product to pulverize it, screening the crushed product with a 100-mesh screen, charging the nitrided powder which has passed through the screen again into the furnace, maintaining the nitrided powder at a temperature of substantially 800° C. in the furnace for one-half hour in the absence of oxygen, and passing a de-nitriding gas through the furnace to de-nitride the powder therein.

2. A process according to claim 1 wherein the waste gas from the nitriding step is used to de-nitride the nitrided powder in the furnace.

References Cited in the file of this patent

UNITED STATES PATENTS

| | | |
|---|---|---|
| 2,164,198 | Clements et al. | June 27, 1939 |
| 2,441,770 | Kroll | May 18, 1949 |

OTHER REFERENCES

ASM Metals Handbook, 1948 ed., page 699, published by The American Society for Metals, Novelty, Ohio.